US012479001B2

(12) United States Patent
Ye

(10) Patent No.: US 12,479,001 B2
(45) Date of Patent: Nov. 25, 2025

(54) ELECTRIC HOT MELT GLUE PEN

(71) Applicants: Jingrong Ye, Hangzhou (CN); Genzhang Ye, Jinhua (CN)

(72) Inventor: Genzhang Ye, Jinhua (CN)

(73) Assignees: Jingrong Ye, Hangzhou (CN); Genzhang Ye, Jinhua (CN); Hangzhou Uni-Hosen Electromechanical Tools Co., Ltd., Hangzhou (CN)

(*) Notice: Subject to any disclaimer, the term of this patent is extended or adjusted under 35 U.S.C. 154(b) by 243 days.

(21) Appl. No.: 18/241,243

(22) Filed: Sep. 1, 2023

(65) Prior Publication Data

US 2025/0073743 A1 Mar. 6, 2025

(51) Int. Cl.
*B05C 17/005* (2006.01)

(52) U.S. Cl.
CPC .... *B05C 17/0053* (2013.01); *B05C 17/00546* (2013.01)

(58) Field of Classification Search
USPC .......................................................... 222/146.5
See application file for complete search history.

(56) References Cited

U.S. PATENT DOCUMENTS 1,769,437 A * 7/1930 Kromer, Jr. .............. B44D 3/22 401/265
3,612,357 A * 10/1971 Ruskin ................ B05C 17/0053 337/392
4,639,155 A * 1/1987 Schuster ........... B05C 17/00546 401/2
4,776,490 A * 10/1988 Wingert .............. B05C 17/0053 226/127
6,082,917 A * 7/2000 Noguchi ................ A45D 40/04 401/86
6,142,207 A * 11/2000 Richardot ................ H05B 3/42 219/229
6,457,889 B1 * 10/2002 Lin ..................... B05C 17/0053 401/2
6,558,059 B1 * 5/2003 Hillinger ........... B05C 17/00536 401/2
6,747,251 B1 * 6/2004 Belanger ........... B05C 17/00546 219/535
6,820,768 B2 * 11/2004 Belanger ........... B05C 17/00526 222/391
6,838,642 B2 * 1/2005 Richardot ......... B05C 17/00546 219/229
9,586,229 B1 * 3/2017 Lee ..................... B05C 17/0053
12,076,941 B2 * 9/2024 Snyder .............. B05C 17/00526
2003/0146264 A1 * 8/2003 Miyazaki ............. B23K 3/0361 228/51
2003/0150875 A1 * 8/2003 Belanger ........... B05C 17/00526 222/146.5
2004/0060665 A1 * 4/2004 Richardot ......... B05C 17/00546 156/578

(Continued)

*Primary Examiner* — Paul R Durand
*Assistant Examiner* — Michael J. Melaragno
(74) *Attorney, Agent, or Firm* — Che-Yang Chen

(57) ABSTRACT

An electric hot melt glue pen for melting a glue stick includes a pen housing having a stick passage, a heating assembly including a heating tube and a heating sleeve layer which is wound around the heating tube for heating the heating tube, a control assembly including a control circuit board, and a driving assembly arranged to drive the glue stick to move forward toward the heating tube along the stick passage.

19 Claims, 9 Drawing Sheets

(56) References Cited

U.S. PATENT DOCUMENTS

| | | | | |
|---|---|---|---|---|
| 2005/0264419 | A1* | 12/2005 | van der Meer | B43K 29/08 340/572.1 |
| 2006/0081650 | A1* | 4/2006 | Axinte | B05C 17/00526 222/146.2 |
| 2006/0083574 | A1* | 4/2006 | Lee | B05C 17/00526 401/2 |
| 2006/0191957 | A1* | 8/2006 | Axinte | B05C 17/00526 222/146.5 |
| 2006/0196888 | A1* | 9/2006 | Agronin | B05C 17/0053 222/173 |
| 2012/0048889 | A1* | 3/2012 | Yung-Kuan | B05C 17/0053 226/127 |
| 2017/0128977 | A1* | 5/2017 | Hsu | B05C 17/0052 |
| 2017/0282208 | A1* | 10/2017 | Seferi | B05C 17/0053 |
| 2018/0111213 | A1* | 4/2018 | Mantes | B23K 3/0323 |
| 2021/0283645 | A1* | 9/2021 | Belanger | B05C 17/00533 |
| 2023/0202122 | A1* | 6/2023 | Snyder | B05C 17/0053 156/579 |
| 2024/0359207 | A1* | 10/2024 | Zhuang | B05C 17/0053 |
| 2025/0073743 | A1* | 3/2025 | Ye | B05C 17/00546 |
| 2025/0073801 | A1* | 3/2025 | Ye | B23K 3/0323 |

* cited by examiner

ELECTRIC HOT MELT GLUE PEN

BACKGROUND OF THE PRESENT INVENTION

Field of Invention

The present invention relates to a hot melt glue device, and more particularly to an electric hot melt glue pen.

Description of Related Arts

A hot melt glue device such as a hot melt glue gun is a handheld device that lets a user to melt and apply hot melt adhesive. The hot melt adhesive, which is in the form of solid stick, is fed to the nozzle by a driving mechanism and is melted by a heating mechanism, so that melted glue is discharged through the nozzle for applying the glue flow.

FIG. 1 illustrates a typical conventional hot melt glue gun including a gun barrel 1, a handle 2 vertically extended from the gun barrel 1, and a trigger 3 connected to the handle 2. A user uses his or her finger to press the trigger 3 to activate the glue applying operation.

The configuration with the gun barrel 1 and the handle 2 makes the conventional hot melt glue gun be bulk in size and is not conveniently to be carried out for portable use. In addition, a packing pox stores a reduced number of the conventional hot melt glue guns because there is a waste of storing space resulting from the structure of the conventional hot melt glue guns, so that it arises a cost issue for the manufacturers to transport the hot melt glue guns from the factory to the warehouse, and for the distributors to ship the hot melt glue guns from the warehouse to the end user.

Furthermore, the heating mechanism of the conventional hot melt glue gun generally employs positive temperature coefficient heating plates 4 to heat the solid glue sticks, so that the heating efficiency is poor, and it may takes a few minutes for heating up a heating tube of the heating mechanism.

SUMMARY OF THE PRESENT INVENTION

The invention is advantageous in that it provides an electric hot melt glue pen which is shaped like a pen that allows the user to conveniently operate by fingers holding the electric hot melt glue pen.

Another advantage of the present invention is to provide an electric hot melt glue pen which has a structure that is suitable for storage, so that a large number of the electric hot melt glue pens are easy for transportation.

Another advantage of the present invention is to provide an electric hot melt glue pen which reduce the cost of the storing and transportation.

Another advantage of the present invention is to provide an electric hot melt glue pen which adopts a heater element that is wound and wrapped around a heating tube, so as to increase the heating efficiency, and thus the melted glue flow can be discharged within a few seconds.

Another advantage of the present invention is to provide an electric hot melt glue pen, wherein the heater element comprises a thick film layer which has a relatively low electric resistance, so that the heating tube can be quickly heated to the working temperature by the thick film layer.

Another advantage of the present invention is to provide an electric hot melt glue pen, wherein the thick film layer can be printed on the heating tube, so that the thick film layer can be evenly formed on the heating tube, and the contact area between the heating tube and the thick film layer is increased, so that the heating efficiency is increased.

Another advantage of the present invention is to provide an electric hot melt glue pen, wherein the heating tube comprises an inward extending wall extending into a tube body of the heating tube, so as to increase the heating area of the heating tube, so as to quickly melt the glue stick.

Another advantage of the present invention is to provide an electric hot melt glue pen, wherein the inward extending wall has a plurality of holes to divide the melted glue flow in the heating tube into a plurality of flows feeding into the discharging nozzle, so as to prevent the melted glue flow to be clogged at the discharging nozzle.

Another advantage of the present invention is to provide an electric hot melt glue pen, wherein the electric hot melt glue pen comprises a driving assembly that is able to powerfully drive the glue stick to move toward the heating assembly.

Additional advantages and features of the invention will become apparent from the description which follows, and may be realized by means of the instrumentalities and combinations particularly pointing out in the appended claims.

According to the present invention, the foregoing and other objects and advantages are attained by an electric hot melt glue pen for melting a glue stick, comprising:

- a pen housing having a stick passage;
- a heating assembly which comprises a heating tube and a heating sleeve layer which is wound around the heating tube for heating the heating tube;
- a control assembly which comprises a control circuit board, wherein the heating sleeve layer is electrically connected to the control circuit board; and
- a driving assembly arranged to drive the glue stick to move forward toward the heating tube along the stick passage.

According to an embodiment of the present invention, the heating sleeve layer is a resistance heating film.

According to an embodiment of the present invention, the heating sleeve layer is a rectangular film which is wrapped and attached around the heating tube.

According to an embodiment of the present invention, the heating sleeve layer is a thick film layer.

According to an embodiment of the present invention, the heating tube is made of material selected from the group consisting of thermal conductive silicon, thermal conductive grease, thermal conductive ceramics, and alumina.

According to an embodiment of the present invention, the heating assembly further comprises a heat insulation layer which is sleeved on the heating tube, wherein the heating sleeve layer is sandwiched between the heating tube and the heat insulation layer.

According to an embodiment of the present invention, the heater element comprises two electrode connecting members electrically connecting the heating sleeve layer to the control circuit board.

According to an embodiment of the present invention, the heat insulation layer comprises a front insulation sleeve and a rear insulation sleeve, wherein the two electrode connecting members are extended out of the heat insulation layer from a position between the front insulation sleeve and the rear insulation sleeve.

According to an embodiment of the present invention, the heating tube comprises a tube body and a feeding nozzle, wherein the front insulation sleeve comprises a sleeve body which is sleeved on the tube body and a nozzle portion which is sleeved on the feeding nozzle of the heating tube.

According to an embodiment of the present invention, the heating tube comprises a tube body, a feeding nozzle connected to the tube body, and an inner extending wall transversely provided adjacent to the feeding nozzle, wherein the inner extending wall has a plurality of holes communicating the feeding nozzle with the tube body.

According to an embodiment of the present invention, the heating tube comprises an inner extending wall transversely provided adjacent to the feeding nozzle, wherein the inner extending wall has a plurality of holes communicating the feeding nozzle with the tube body.

According to an embodiment of the present invention, the inner extending wall is vertically or inclinedly extended from an inner side of one of the tube body and the feeding nozzle.

According to an embodiment of the present invention, the driving assembly comprises a motor comprising a motor shaft, a driving gear mounted on the motor shaft, and two gear elements engaged with the driving gear for driving the glue stick to move forward, wherein the motor is electrically connected to the control circuit board.

According to an embodiment of the present invention, each of the gear elements comprises an engaging gear which is engaged with the driving gear and a stick moving gear for driving the glue stick to move forward, wherein the two gear elements are provided at two opposite sides of the driving gear, so as to configure the two stick moving gears at two sides of the glue stick to rotate in different directions to have contact with the glue stick, so as to drive the glue stick to move forward.

According to an embodiment of the present invention, the driving assembly comprises an motor comprising an motor shaft, a driving gear mounted on the motor shaft, an active stick engaging gear coupled to the driving gear, and a passive stick engaging gear rotatably mounted to the pen housing, wherein the glue stick is adapted for being arranged between the active stick engaging gear and the passive stick engaging gear, wherein when the when the motor is actuated to rotate, the driving gear on the motor shaft is driven to rotate to drive the active stick engaging gear to rotate, the passive stick engaging gear which is not coupled to the motor is also driven to rotate because of frictional contact between the glue stick and the passive stick engaging gear, so to drive the glue stick to move forward.

According to an embodiment of the present invention, the driving assembly comprises two motors each comprising an motor shaft, two driving gears mounted on the corresponding motor shafts, two active stick engaging gears coupled to the driving gears respectively, wherein the glue stick is adapted for being guided between the two active stick engaging gears.

According to an embodiment of the present invention, the control assembly further comprises a power module which is assembled to the pen housing and is electrically connected to the control circuit board.

According to an embodiment of the present invention, the pen housing comprises an outer housing body which is shaped like a pen, a housing support disposed in the outer housing body for supporting the control assembly and the driving assembly, a cap mounted to the outer housing body for housing the heating assembly.

According to an embodiment of the present invention, the outer housing body comprises a front tubular portion and a rear tubular portion assembled with the front tubular portion, wherein the driving assembly is mounted within the front tubular portion, wherein the control assembly further comprises a power module which electrically connected to the control circuit board, wherein the power module is assembled at a position within the rear tubular portion.

According to an embodiment of the present invention, the outer housing body further comprise a clip portion extended from the rear tubular portion to define a clip space between the clip portion and the rear tubular portion.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
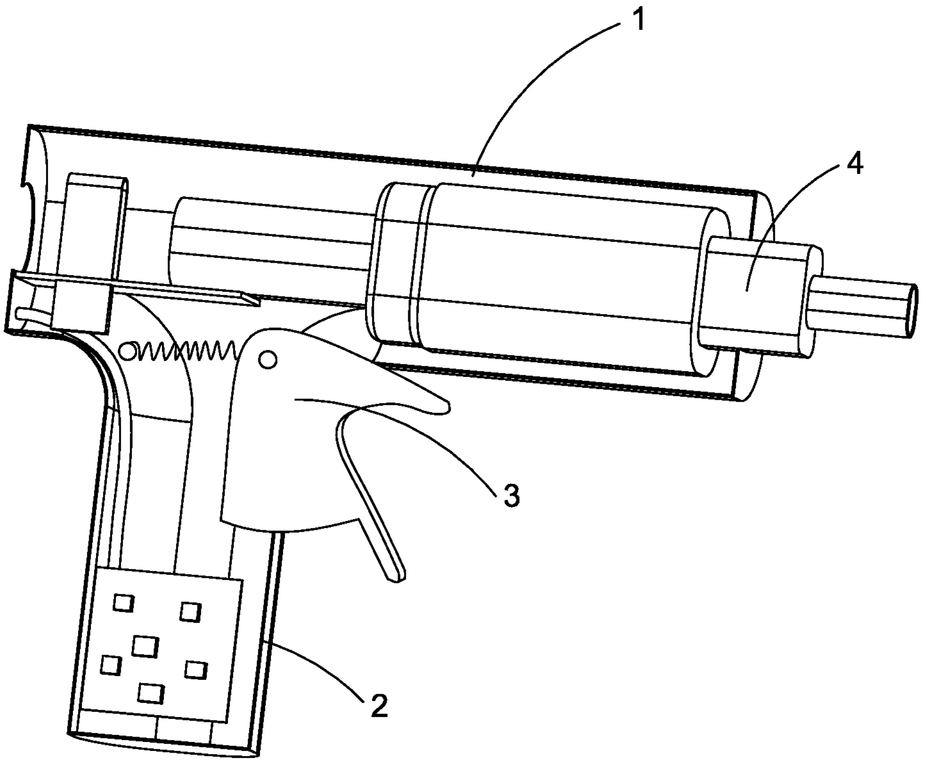
PRIOR ART FIG.1
FIG. 1 is a schematic view illustrating a conventional hot melt glue gun.
Figure 2:
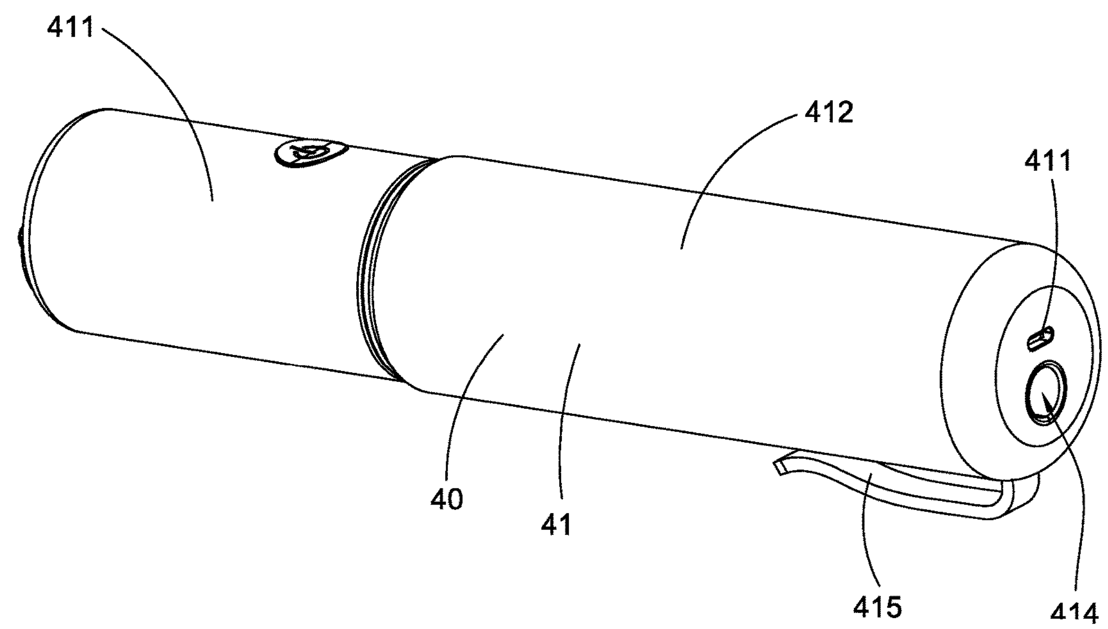
FIG. 2 is a perspective view of an electric hot melt glue pen according to a preferred embodiment of the present invention.
Figure 3:
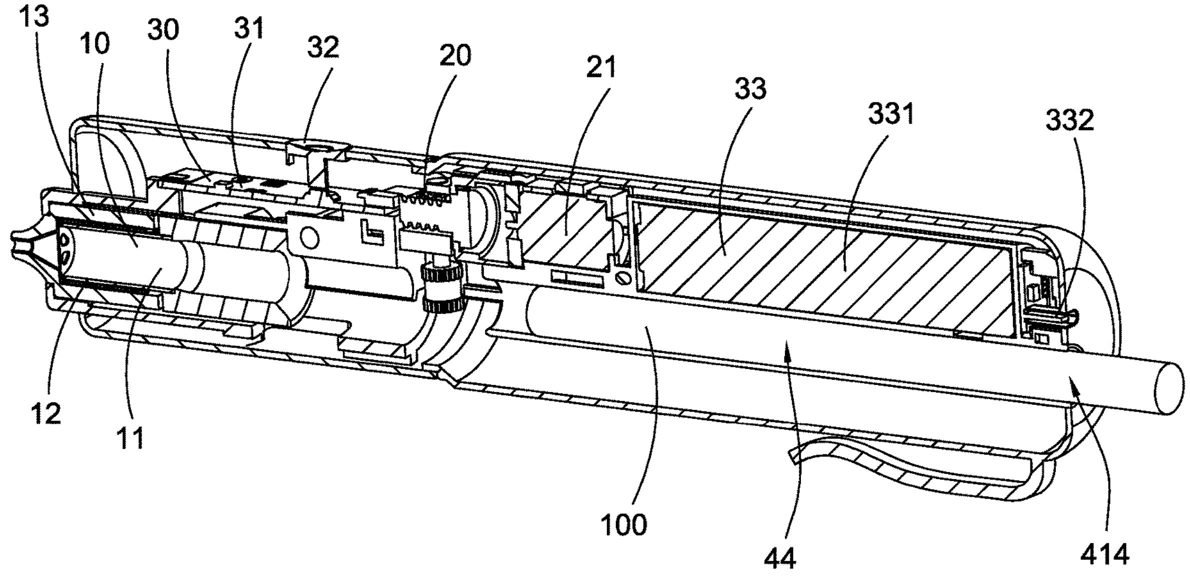
FIG. 3 is a schematic view illustrating the electric hot melt glue pen being in the sate for moving and melting a glue stick according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 2 to FIG. 8 of the drawings, an electric hot melt glue pen according to a preferred embodiment of the present invention is illustrated. The electric hot melt glue pen comprises a heating assembly 10 for heating a glue stick 100, a driving assembly 20 for driving the glue stick to move toward the heating assembly 10, a control assembly 30 for controlling the operation of the heating assembly 10 and the driving assembly 20, and a pen housing 40 for mounting the heating assembly 10, the driving assembly 20, and the control assembly 30.

According to the present invention, the pen housing 40 is shaped like a pen that is convenient for a user to use his or her fingers to hold on the electric hot melt glue pen to carry out the glue melting and glue applying operation. The heating assembly 10, the driving assembly 20, and the control assembly 30 are substantially installed within the pen housing 40, so that there is no handle vertically extended from the pen housing 40 for receiving components such as battery, so that the total size of the electric hot melt glue pen is reduced.

In other words, the pen housing 40 has an elongated structure that is shaped like a pen, so that it allows the user to conveniently operate by fingers holding the electric hot melt glue pen. In addition, the pen housing 40 has a structure that is suitable for storage, so that a large number of the electric hot melt glue pens are easy for transportation. More specifically, the large number of the electric hot melt glue pens are stacked with each other side by side, so as to reduce the waste storing space, and thus the cost of the storing and transportation of the large number of the electric hot melt glue pens from the factory to the warehouse is reduced, and smaller packaging box for shipping the electric hot melt glue pen from the warehouse to the user also can be reduced.

More specifically, the pen housing 40 comprises an outer housing body 41, a housing support 42 assembled in the outer housing body 41, a cap 43 mounted to the outer housing body 41. The outer housing body 41 has a pen like appearance, the housing support 42 is disposed in the outer housing body 41 for mounting the control assembly 30 and the driving assembly 20. The cap 43 is provided at a position corresponding to the heating assembly 10.

The pen housing 40 has a stick passage 44 for guiding and feeding the glue stick 100. Accordingly, the glue stick 100 is driven by the driving assembly 20 to move along the stick passage 44 toward the heating assembly 10. The stick passage 44 can be formed in one or more tubes. In this embodiment, the stick passage 44 is formed in the housing support 42. In other words, the housing support 42 comprises a passage defining portion 421 which forms the stick passage 44.

The heating assembly 10 comprises a heating tube 11, a heater element 12 and an heat insulation element 13. The glue stick 100 can be feed into the heating tube 11 by the driving assembly 10 through the stick passage 44, the heater element 12 is wound and wrapped around the heating tube 11 for heating the portion of the glue stick 100 reaching into the heating tube 11, the heating insulation element 13 is wound and wrapped around the heater element 12 for preventing the heat to be transferred to the pen housing 40, so that the user will not burn his or her fingers which are holding on the pen housing 40.

The heating tube 11 can be made of thermal conductive material which is not electrical conductive material. For example, the heating tube 11 can be made of thermal conductive silicon, thermal conductive grease, thermal conductive ceramics, alumina, or the like. Therefore, heat from the heater element 12 can be effectively transferred to the heating tube 11 for heating and melting the glue stick 100.

The heater element 12 can be embodied to comprise a heating coil wound around the heating tube 11, or a cylindrical heating film which is sleeved around the heating tube 11, so as to increase the contact area between the heater element 12 and the heating tube 11. The cylindrical heating film can be a resistance heating layer which a relatively low electric resistance and can be embodied as a rectangular film that is wound and wrapped around the heating tube 11.

Figure 5A:
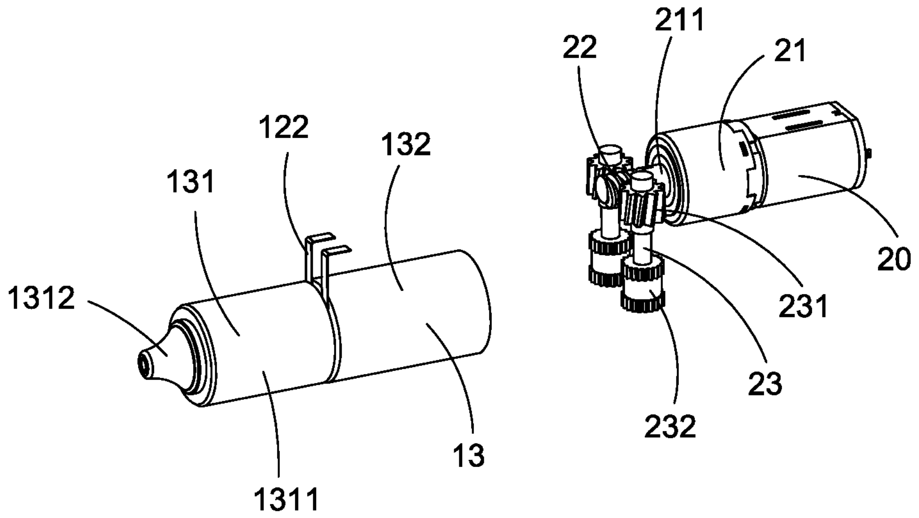
FIG. 5A is a perspective view illustrating a heating assembly and a driving assembly of the electric hot melt glue pen according to the above preferred embodiment of the present invention
Figure 5B:
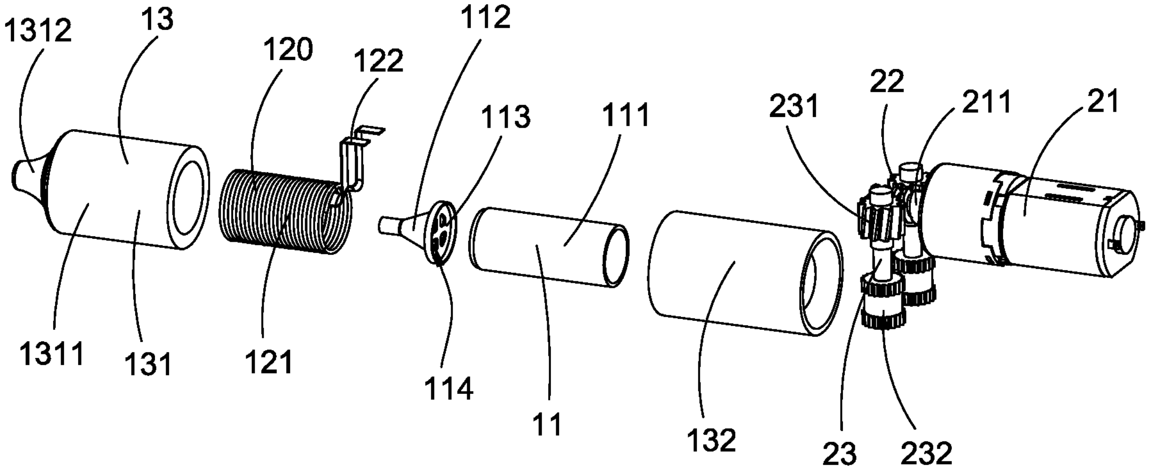
FIG. 5B is an exploded view illustrating the heating assembly of the electric hot melt glue pen according to the above preferred embodiment of the present invention.
Figure 7:
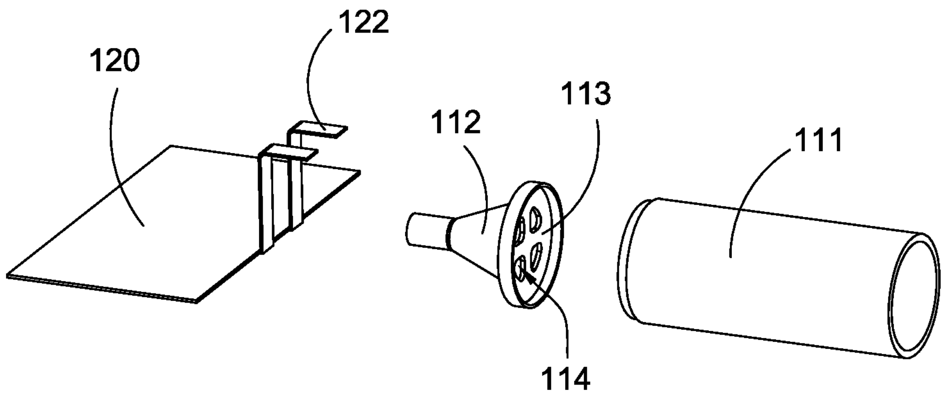
FIG. 7 is a perspective view illustrating an alternative heating sleeve layer of the electric hot melt glue pen before it is wrapped around a heating tube according to the above preferred embodiment of the present invention.
Figure 8:
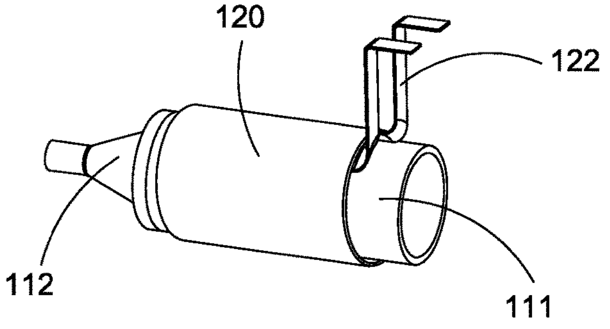
FIG. 8 is a perspective view illustrating the alternative heating sleeve layer of the electric hot melt glue pen which is wrapped around the heating tube according to the above preferred embodiment of the present invention.

Preferably, as shown in FIG. 5B of the drawings, according to this preferred embodiment, the heater element 12 comprises a heating sleeve layer 120 which can be embodied as a thick film layer 121. As shown in FIGS. 7 and 8 of the drawings, according to another example of the heater element of the preferred embodiment, the heater element 12 comprises a heating sleeve layer 120 which can be a resistance heating film, it can be a rectangular film that is wrapped around the heating tube 11.

More specifically, the thick film layer 121 is provided on an outer surface of the heating tube 11. The thick film layer 121 forms an electrical heating circuit by a thick film paste which is made of solid powder doped with metal resistance paste and organic solvents, and the mixture is rolled for multiple times. The process of paste printing is carried out by a screen printer machine. The screen is strained into an aluminium frame and the thick film paste is pressed onto the carrier through it by a printing squeegee. The squeegee has constant speed and pushes the screen with contact force. The material of the screen can be stainless steel or polymer. The design of the printed layer is realized with a negative emulsion mask on polymer screens while with openings on masks.

The thick film layer 121 has a relatively low electric resistance, so that the heater element 12 can be quickly heated up for heating the heating tube 11. According to the present invention, the heating tube 11 can be heated to its working temperature in three to six seconds, so that the electric hot melt glue pen is able to quickly discharge the melted glue flow in a few seconds. In other words, comparing with the heating mechanism of the conventional hot melt glue gun, the heating efficiency of the heater element 12 attached on the heating tube 11 is greatly enhanced. By introducing the thick film layer 121 into the heater element 12, the time for getting into the state for applying the melted glue flow is significantly reduced.

The control assembly 30 comprises a control circuit board 31, a switch 32 which is electrically connected to the control circuit board 31, and a power module 33 which is electrically connected to the control circuit board 31. The power module 33 comprises a rechargeable battery 331 and an electrical charging interface 332 for being electrically connected to an external power source for electrically charging the rechargeable battery 331 which is used to supply electricity to the control circuit board 31.

According to the present invention, the control circuit board 31 and the power module 33 are all assembled in the elongated structure of the pen housing 40. More specifically, the control circuit board 31 and the power module 33 are assembled to the housing support 42 within the outer housing 41, so that no vertical handle housing portion like the conventional hot melt glue gun is required in the present invention to receive components.

The outer housing 41 comprises a front tubular portion 411 and a rear tubular portion 412 which are assembled with the front tubular portion 411. A mounting hole 413 is formed in the front tubular portion 411 for mounting the switch 32. The control circuit board 31 is housed in the front tubular portion 411. The power module 33 is housed in the rear tubular portion 412.

The rear tubular portion 412 has an stick inlet 414 communicated to the stick passage 44 for inserting the glue stick 100 which will then be driven to move forward by the driving assembly 20 along the stick passage 44.

The outer housing 41 further comprises a clip portion 415 connected to the rear tubular portion 412 to define a clip space 416 between the clip portion 415 and the rear tubular portion 412, so that the clip portion 415 is able to clip on clothes of the user, such a pocket on the clothes of the user, so as to facilitate the user to carry the electric hot melt glue pen for portable use.

The switch 32 is operationally coupled to the control circuit board 31 which is operationally coupled to the heater element 12 of the heating assembly 10 and the driving assembly 20, so that the operation on the switch 32 by the user is able to control the operation of the heater element 12 of the heating assembly 10 and the driving assembly 20.

For example, the control circuit board 31 is programmed that when the switch 32 is continually pressed for a few seconds to wake up or turn off the electric hot melt glue pen, the switch 32 is pressed for one time to activate the heater element 12 of the heating assembly 10 and the driving assembly 20, the switch 32 is pressed for two times to stop the operation of the heater element 12 and the driving assembly 20.

The heater element 12 further comprises two electrode connecting members 122 which electrically connect the thick film layer 121 to the control circuit board 31, so that the thick film layer 121 is supplied with electricity from the control circuit board 31 which is powered by the power module 33, so that the thick film layer 121 is heated up for heating the heating tube 11.

The heating tube 11 comprises a tube body 111 and a feeding nozzle 112 connected to the tube body 111. Preferably, the thick film layer 121 is substantially extended along a total length of the tube body 111, so as to increase the heating efficiency of the heater element 12.

As shown in FIG. 5B of the drawings, the thick film layer 121 is wound around the tube body 111. The thick film layer 121 can be directly laminated on the outer surface of the tube body 111. Alternatively, the thick film layer 121 is formed on a plane rectangular carrier layer, and then the thick film layer 121 and the carrier layer is wrapped around and attached to the tube body 111.

The feeding nozzle 112 has a discharging outlet 1121 at a front end thereof, the glue stick 100 is continually fed into the tube body 111 to produce the melted glue flow which is squeezed into the discharging nozzle 112, so that the melted glue flow is then discharged through the discharging outlet 1121.

Figure 4A:
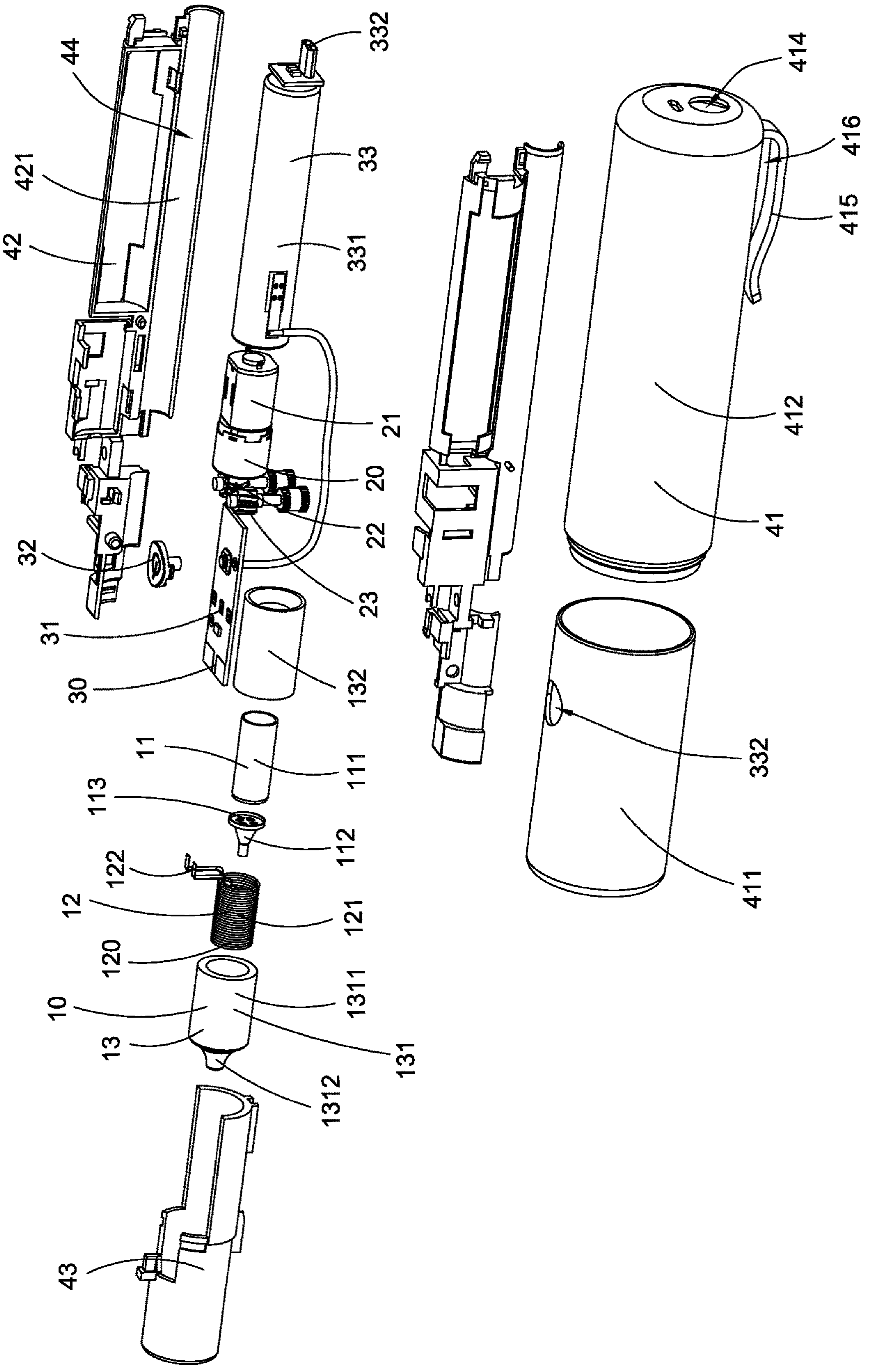
FIG. 4A is an exploded view of the electric hot melt glue pen according to the above preferred embodiment of the present invention.
Figure 4B:
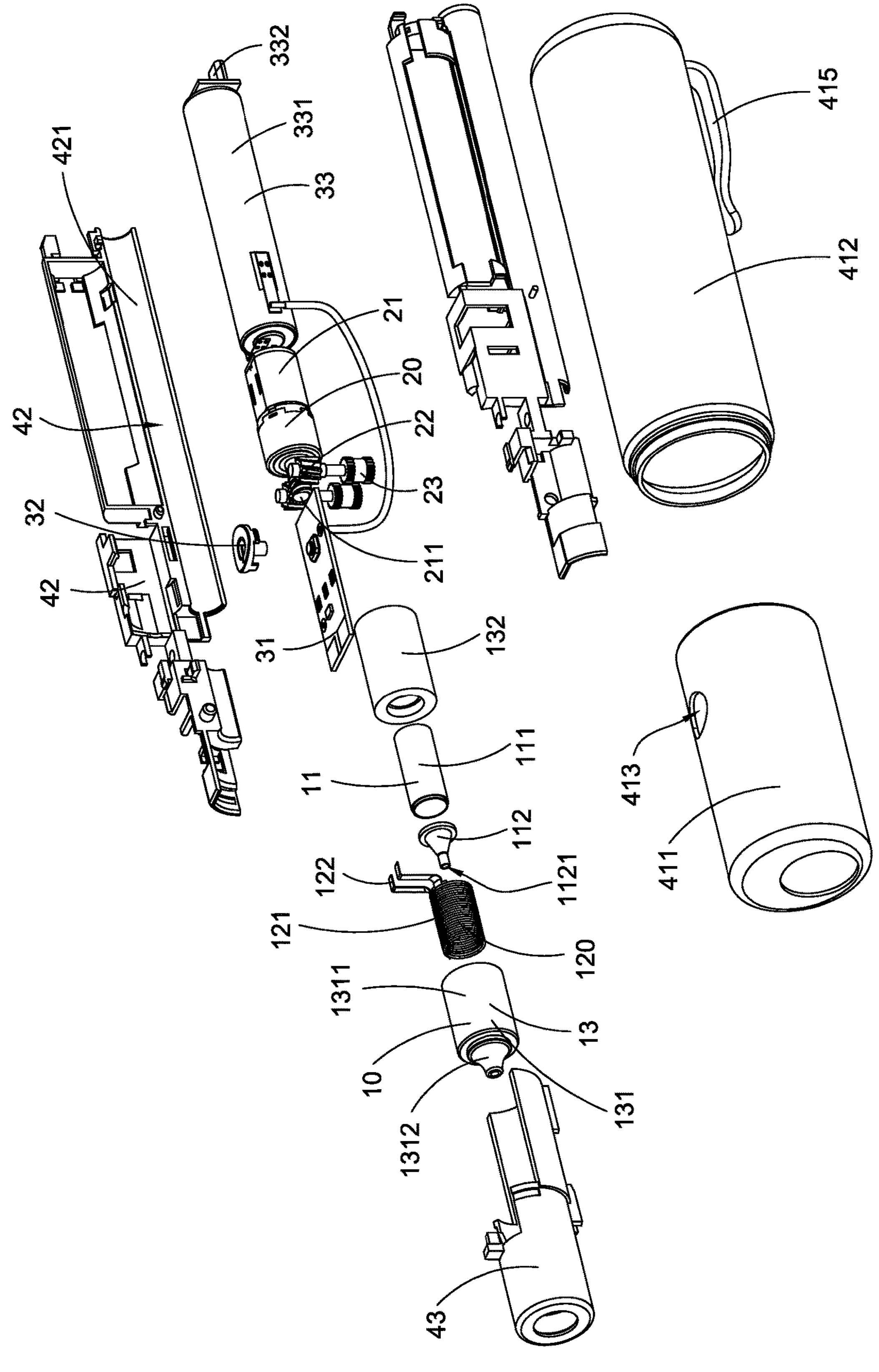
FIG. 4B is another exploded view of the electric hot melt glue pen according to the above preferred embodiment of the present invention.

Preferably, the feeding nozzle 112 has a diameter which is gradually reduced from the side adjacent to the tube body 111 to the side corresponding to the discharging outlet 1121. As shown in FIG. 4A and FIG. 4B of the drawings, the feeding nozzle 112 is constructed to be a conical structure.

Figure 6:
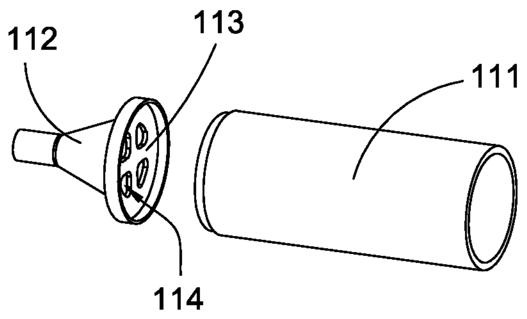
FIG. 6 is an exploded view illustrating a heating tube of the electric hot melt glue pen according to the above preferred embodiment of the present invention.

According to this embodiment, the heating tube 11 further comprises an inner extending wall 113 which is provided at a position adjacent to the feeding nozzle 112. The inner extending wall 113 is formed with a plurality of holes 114 for allowing the melted glue flow to be fed into the feeding nozzle 112. As shown in FIG. 6 of the drawings, the inner extending wall 113 is integrally extended from an inner side of the feeding nozzle 112 at a side distal to the discharging outlet 1121, so that the melted glue flow generated in the tube body 111 is divided into several small glue flows that are fed into the feeding nozzle 112, so as to prevent the melted glue flow to be clogged in the tube body 111.

The inner extending wall 113 is vertically or inclinedly extended from the inner side of the feeding nozzle 112, so that the inner extending wall 113 also can be used for heating the material of the glue stick 100 in the tube body 111, so that the portion of the glue stick 100 reaching into the tube body 111 is heated completely and melted to provide the melted glue flow. Accordingly, when the portion of the glue stick 100 reaches to the inner extending wall 111, the inner extending wall 113 further functions to melt the material of the glue stick 100, so as to ensure that all the material of the glue stick 100 reaching into the tube body 111 is completely melted, so that the possibility of the material of the glue stick 100 being not completely melted and being clogged in the tube body 111 is reduced.

Accordingly, the thick film layer 121 of the heater element 12 generates heat that is transferred to the heating tube 11, so that the inner surface of the tube body 111 can be used to heat the portion of the glue stick 100 reaching into the tube body 111, the inner extending wall 113 facing towards the channel in the tube body 111 also is used to heat the portion of the glue stick 100 reaching into the tube body 111.

Alternatively, the inner extending wall 113 can be integrally and inwardly extended from the inner side of the tube body 111. Alternatively, the inner extending wall 113 may be an add-on structure that can be detachably disposed into the tube body 111. The inner extending wall 113 is extended into the inner space of the heating tube 11, the holes 114 are used to communicate the two channels at the two opposite sides of the inner extending wall 113 within the heating tube 11.

In this embodiment, the heat insulation element 13 comprises a front insulation sleeve 131 adjacent to the feeding nozzle 112 and a rear insulation sleeve 132 adjacent to the driving assembly distal to the feeding nozzle 112, the front insulation sleeve 131 is sleeved on the tube body 111 and the thick film layer 121 to firmly sandwich the thick film layer 121 between the tube body 111 and the front insulation sleeve 131. The rear insulation sleeve 131 is sleeved on a rear end portion of the tube body 111, so that the two electrode connecting members 122 are extended out from the the gap between the front insulation sleeve 131 and the rear insulation sleeve 132, as shown in FIG. 5A of the drawings, so as to be electrically connected to the control circuit board 31, so as to ensure the electrical connection between the control circuit board 31 and the thick film layer 121 of the heater element while enhance the insulation performance of the heat insulation element 13, so as to reduce the heat to be transferred to the outer housing body to burn the user's fingers.

According to this embodiment, the front insulation sleeve 131 comprises a sleeve body 1311 and a nozzle portion 1312 which has a conical structure that is wound around the feeding nozzle 112. The cap 43 is embodied as a tubular structure for receiving the front insulation sleeve 131 and the rear insulation sleeve 132 of the heat insulation element 13, so that the heat is prevented from transferring from the tube body 111 and the feeding nozzle 112 of the heating tube 11 to the cap 43.

The driving assembly 20 can be embodied as a screw driving mechanism, a gear driving mechanism, or other suitable driving mechanism. In this embodiment, the driving assembly 20 is embodied as a gear driving mechanism which comprises a motor 21 comprising a motor shaft 211, a driving gear 22 mounted on the motor shaft 211, and two gear elements 23 engaged with the driving gear 22 for driving the glue stick 100 to move forward. The motor 21 is electrically connected to the control circuit board 31 and is supplied with the power by the power module 33.

Each of the gear elements 23 comprises an engaging gear 231 which is engaged with the driving gear 22 and a stick moving gear 232 for driving the glue stick 100 to move forward. The gear elements 23 are provided at two opposite sides of the driving gear 22, so as to configure the two stick moving gears 232 at two sides of the glue stick 100 to rotate in different directions to have contact with the glue stick 100, so as to drive the glue stick 100 to move forward.

Figure 9:
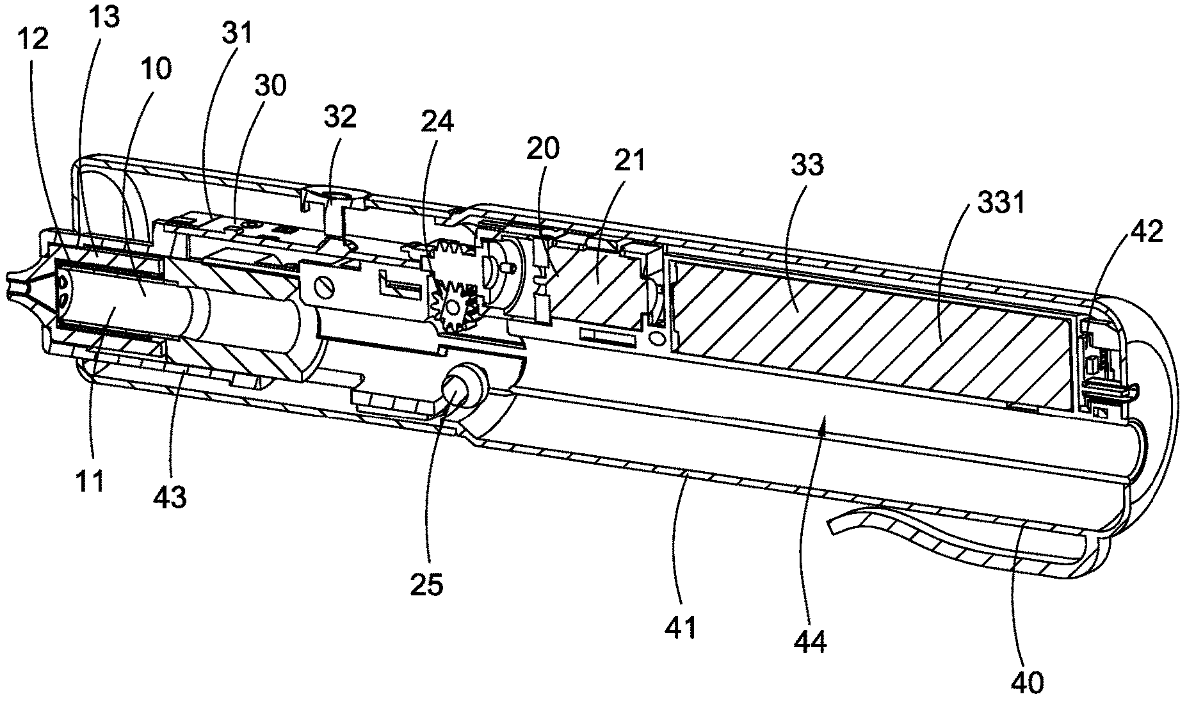
FIG. 9 is a sectional view of an electric hot melt glue pen according to an alternative mode of the above preferred embodiment of the present invention.
Figure 10:
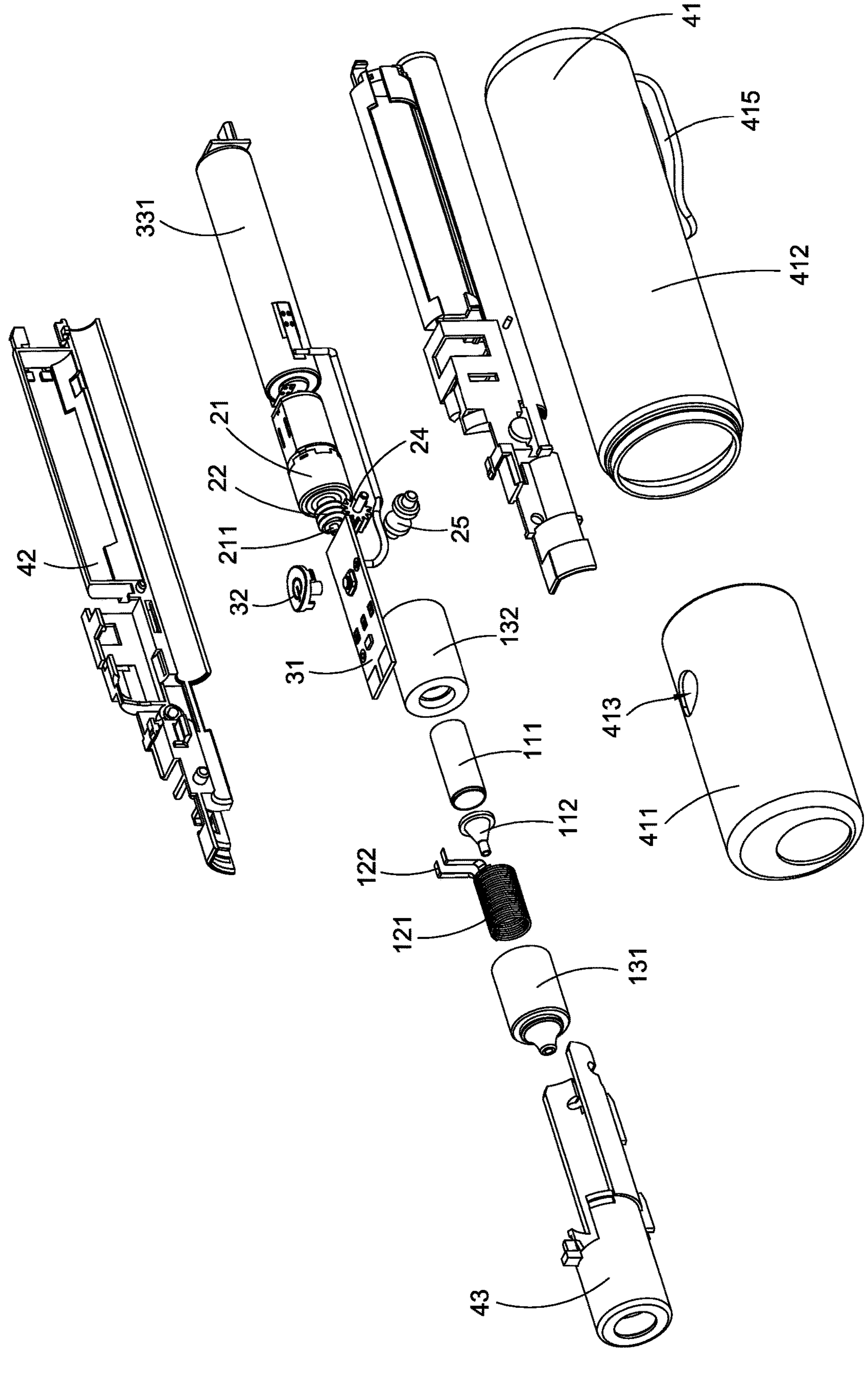
FIG. 10 is an exploded view of the electric hot melt glue pen according to the alternative mode of the above preferred embodiment of the present invention.

Referring to FIGS. 9 and 10 of the drawings, an electric hot melt glue pen according to an alternative mode of the above preferred embodiment of the present invention is illustrated. The electric hot melt glue pen is illustrated to comprise a heating assembly 10 for heating a glue stick 100, a driving assembly 20 for driving the glue stick 100 to move toward the heating assembly 10, a control assembly 30 for controlling the operation of the heating assembly 10 and the driving assembly 20, and a pen housing 40 for mounting the heating assembly 10, the driving assembly 20, and the control assembly 30. The structures of the heating assembly 10, the control assembly 20 and the pen housing 40 of this alternative mode is similar to the above preferred embodiment.

In this embodiment, the driving assembly 20 comprises an motor 21 comprising an motor shaft 211, a driving gear 22 mounted on the motor shaft 211, an active stick engaging gear 24 coupled to the driving gear 22, and a passive stick engaging gear 25 rotatably mounted to the pen housing 40. Accordingly, the glue stick 100 is arranged between the active stick engaging gear 24 and the passive stick engaging gear 25, so that the when the motor 21 is actuated to rotate, the driving gear 22 on the motor shaft 211 is driven to rotate, so that the active stick engaging gear 24 is simultaneously driven to rotate, the passive stick engaging gear 25 which is not coupled to the motor 21 is also driven to rotate because of its frictional contact with the glue stick 100 which is driven to move by the rotating active stick engaging gear 25.

Figure 11:
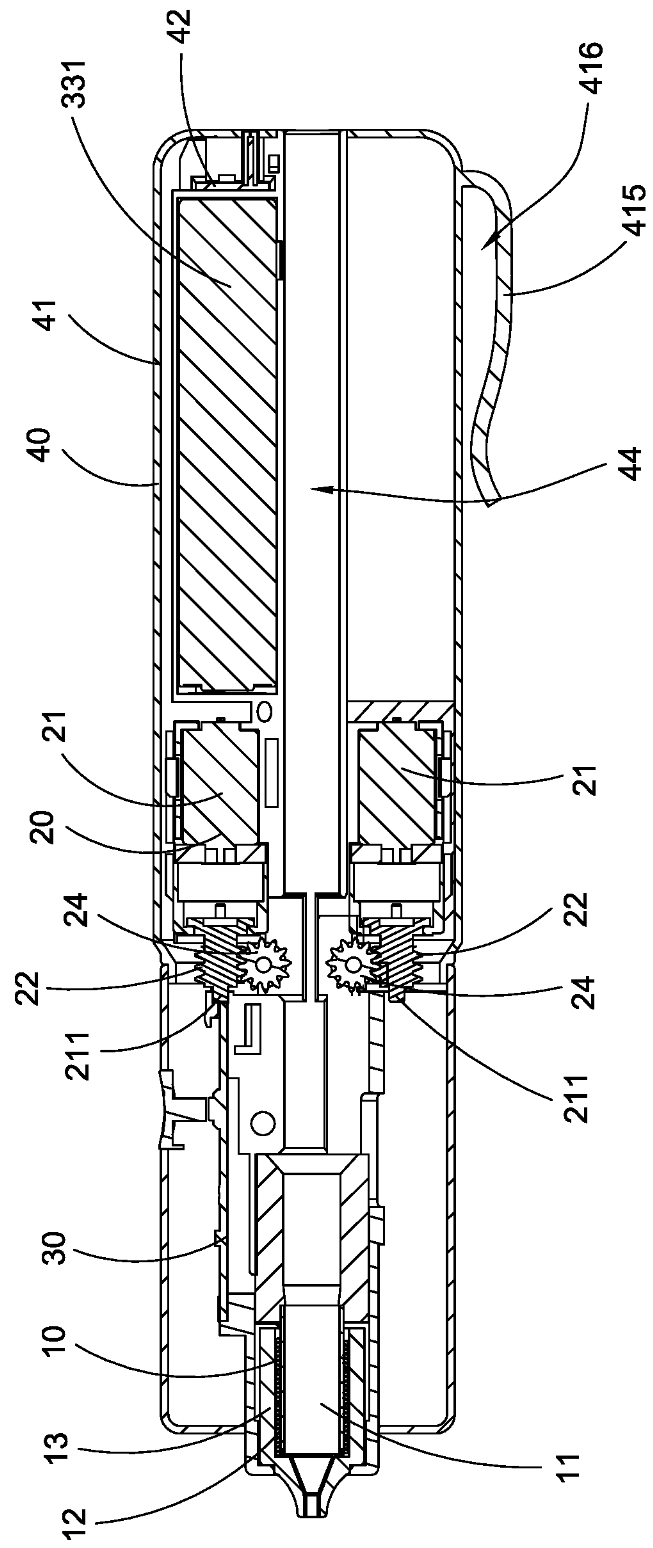
FIG. 11 is a sectional view of an electric hot melt glue pen according to another alternative mode of the above preferred embodiment of the present invention.

Referring to FIG. 11 of the drawings, an electric hot melt glue pen according to another alternative mode of the above preferred embodiment of the present invention is illustrated. The electric hot melt glue pen is illustrated to comprise a heating assembly 10 for heating a glue stick 100, a driving assembly 20 for driving the glue stick 100 to move toward the heating assembly 10, a control assembly 30 for controlling the operation of the heating assembly 10 and the driving assembly 20, and a pen housing 40 for mounting the heating assembly 10, the driving assembly 20, and the control assembly 30. The structures of the heating assembly 10, the control assembly 20 and the pen housing 40 of this alternative mode is similar to the above preferred embodiment.

In this embodiment, the driving assembly 20 comprises two motors 21 each comprising an motor shaft 211, two driving gears 22 mounted on the corresponding motor shafts 211, two active stick engaging gears 24 coupled to the driving gears 22 respectively. The glue stick 100 can be guided to the space between the two active stick engaging gears 24, so that when the two motors 21 are activated to rotate, the two driving gears 22 are driven to rotate, and the two active stick engaging gears 24 are simultaneously driven to rotate, so as to powerfully drive the glue stick 100 to move toward the heating tube 11.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An electric hot melt glue pen for melting a glue stick, comprising:

a pen housing having a stick passage;

a heating assembly which comprises a heating tube and a heating sleeve layer which is wound around said heating tube for heating said heating tube;

a control assembly which comprises a control circuit board, wherein said heating sleeve layer is electrically connected to said control circuit board; and a driving assembly arranged to drive the glue stick to move forward toward said heating tube along said stick passage, wherein said driving assembly comprises a motor comprising a motor shaft, a driving gear mounted on said motor shaft, and two gear elements engaged with said driving gear for driving the glue stick to move forward, wherein said motor is electrically connected to said control circuit board.

2. The electric hot melt glue pen according to claim 1, wherein said heating sleeve layer is a resistance heating film.

3. The electric hot melt glue pen according to claim 1, wherein said heating sleeve layer is a rectangular film which is wrapped and attached around said heating tube.

4. The electric hot melt glue pen according to claim 1, wherein said heating sleeve layer is a thick film layer.

5. The electric hot melt glue pen according to claim 4, wherein said heating tube is made of material selected from the group consisting of thermal conductive silicon, thermal conductive grease, thermal conductive ceramics, and alumina.

6. The electric hot melt glue pen according to claim 1, wherein said heating assembly further comprises a heat insulation layer which is sleeved on said heating tube, wherein said heating sleeve layer is sandwiched between said heating tube and said heat insulation layer.

7. The electric hot melt glue pen according to claim 6, wherein said heater element comprises two electrode connecting members electrically connecting said heating sleeve layer to said control circuit board.

8. The electric hot melt glue pen according to claim 7, wherein said heat insulation layer comprises a front insulation sleeve and a rear insulation sleeve, wherein said two electrode connecting members are extended out of said heat insulation layer from a position between said front insulation sleeve and said rear insulation sleeve.

9. The electric hot melt glue pen according to claim 8, wherein said heating tube comprises a tube body and a feeding nozzle, wherein said front insulation sleeve comprises a sleeve body which is sleeved on said tube body and a nozzle portion which is sleeved on said feeding nozzle of said heating tube.

10. The electric hot melt glue pen according to claim 9, wherein said heating tube comprises an inner extending wall transversely provided adjacent to said feeding nozzle, wherein said inner extending wall has a plurality of holes communicating said feeding nozzle with said tube body.

11. The electric hot melt glue pen according to claim 8, wherein said control assembly further comprises a power module which is assembled to said pen housing and is electrically connected to said control circuit board.

12. The electric hot melt glue pen according to claim 8, wherein said pen housing comprises an outer housing body which is shaped like a pen, a housing support disposed in said outer housing body for supporting said control assembly and said driving assembly, a cap mounted to said outer housing body for housing said heating assembly.

13. The electric hot melt glue pen according to claim 12, wherein said outer housing body comprises a front tubular portion and a rear tubular portion assembled with said front tubular portion, wherein said driving assembly is mounted within said front tubular portion, wherein said control assembly further comprises a power module which electrically connected to said control circuit board, wherein said power module is assembled at a position within said rear tubular portion.

14. The electric hot melt glue pen according to claim 13, wherein said outer housing body further comprise a clip portion extended from said rear tubular portion to define a clip space between said clip portion and said rear tubular portion.

15. The electric hot melt glue pen according to claim 1, wherein said heating tube comprises a tube body, a feeding nozzle connected to said tube body, and an inner extending wall transversely provided adjacent to said feeding nozzle, wherein said inner extending wall has a plurality of holes communicating said feeding nozzle with said tube body.

16. The electric hot melt glue pen according to claim 15, wherein said inner extending wall is vertically or inclinedly extended from an inner side of one of said tube body and said feeding nozzle.

17. The electric hot melt glue pen according to claim 1, wherein each of said gear elements comprises an engaging gear which is engaged with said driving gear and a stick moving gear for driving the glue stick to move forward, wherein said two gear elements are provided at two opposite sides of said driving gear, so as to configure said two stick moving gears at two sides of the glue stick to rotate in different directions to have contact with the glue stick, so as to drive the glue stick to move forward.

18. An electric hot melt glue pen for melting a glue stick, comprising:

a pen housing having a stick passage;

a heating assembly which comprises a heating tube and a heating sleeve layer which is wound around said heating tube for heating said heating tube;

a control assembly which comprises a control circuit board, wherein said heating sleeve layer is electrically connected to said control circuit board; and a driving assembly arranged to drive the glue stick to move forward toward said heating tube along said stick passage, wherein said driving assembly comprises an motor comprising an motor shaft, a driving gear mounted on said motor shaft, an active stick engaging gear coupled to said driving gear, and a passive stick engaging gear rotatably mounted to said pen housing, wherein the glue stick is adapted for being arranged between said active stick engaging gear and said passive stick engaging gear, wherein when said when said motor is actuated to rotate, said driving gear on said motor shaft is driven to rotate to drive said active stick engaging gear to rotate, said passive stick engaging gear which is not coupled to said motor is also driven to rotate because of frictional contact between the glue stick and said passive stick engaging gear, so to drive the glue stick to move forward.

19. An electric hot melt glue pen for melting a glue stick, comprising:

a pen housing having a stick passage;

a heating assembly which comprises a heating tube and a heating sleeve layer which is wound around said heating tube for heating said heating tube;

a control assembly which comprises a control circuit board, wherein said heating sleeve layer is electrically connected to said control circuit board; and a driving assembly arranged to drive the glue stick to move forward toward said heating tube along said stick passage, wherein said driving assembly comprises two motors each comprising an motor shaft, two driving gears mounted on said corresponding motor shafts, two active stick engaging gears coupled to said driving gears respectively, wherein the glue stick is adapted for being guided between said two active stick engaging gears.

* * * * *